United States Patent
Fletcher et al.

[11] 3,915,148
[45] Oct. 28, 1975

[54] THERMOSTATICALLY CONTROLLED NON-TRACKING TYPE SOLAR ENERGY CONCENTRATOR

[76] Inventors: James C. Fletcher, Administrator of the National Aeronautics and Space Administation, with respect to an invention of Katsunori Shimada, Pasadena, Calif.

[22] Filed: Nov. 22, 1974

[21] Appl. No.: 526,448

[52] U.S. Cl. .................. 126/271; 237/1 A; 350/211
[51] Int. Cl.² ............................................. F24J 3/02
[58] Field of Search ............ 126/270, 271; 237/1 A; 60/26; 350/211

[56] References Cited
UNITED STATES PATENTS

| | | | |
|---|---|---|---|
| 937,013 | 10/1909 | Severy | 126/271 |
| 1,101,001 | 6/1914 | Willsie | 126/271 |
| 1,130,871 | 3/1915 | Willsie | 126/271 |
| 1,853,480 | 4/1932 | Wheeler et al. | 126/271 |
| 1,971,242 | 8/1934 | Wheeler | 126/271 |
| 2,762,569 | 9/1956 | Caillol | 126/271 |
| 2,920,710 | 1/1960 | Howard | 126/271 |
| 3,125,091 | 3/1964 | Sleeper, Jr. | 126/271 |
| 3,152,442 | 10/1964 | Rowekamp | 126/271 |

*Primary Examiner*—Kenneth W. Sprague
*Assistant Examiner*—James C. Yeung
*Attorney, Agent, or Firm*—Monte F. Mott; Paul F. McCaul; John R. Manning

[57] ABSTRACT

A solar energy concentrator comprises an array of cylindrical Fresnel lenses, all of which are fixedly aligned in the East-West direction. Each lens concentrates the sun rays and forms a line image which extends in the East-West direction. Located below the lenses are individual fluid channels which extend in the East-West direction and are spaced apart in the South-North direction. Each line image focuses onto preferably not more than two of the channels which absorb heat of the concentrated sun rays. Each channel has a thermostatically controlled valve which controls fluid flow through the channel to take place only when the channel's temperature and/or the fluid therein exceed a threshold temperature level.

10 Claims, 6 Drawing Figures

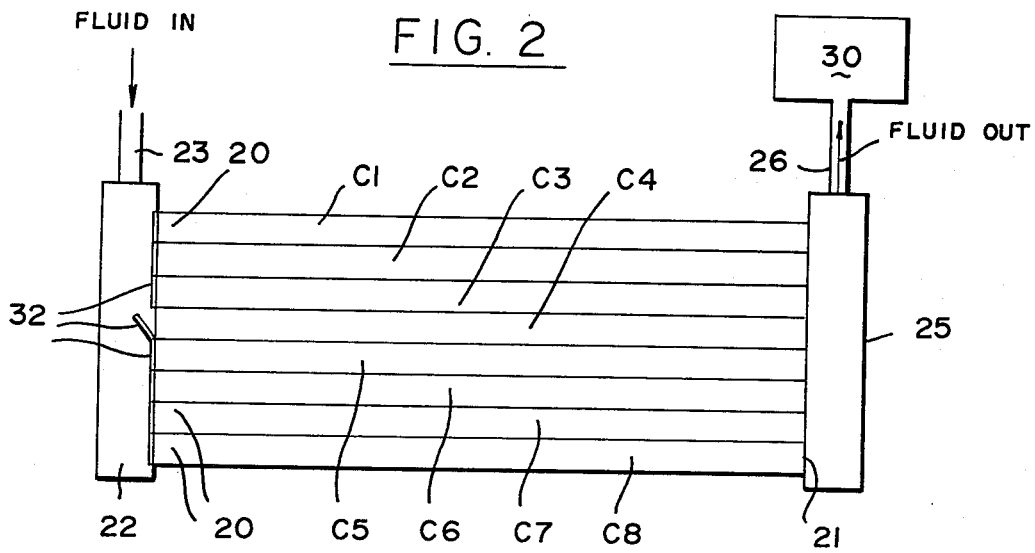
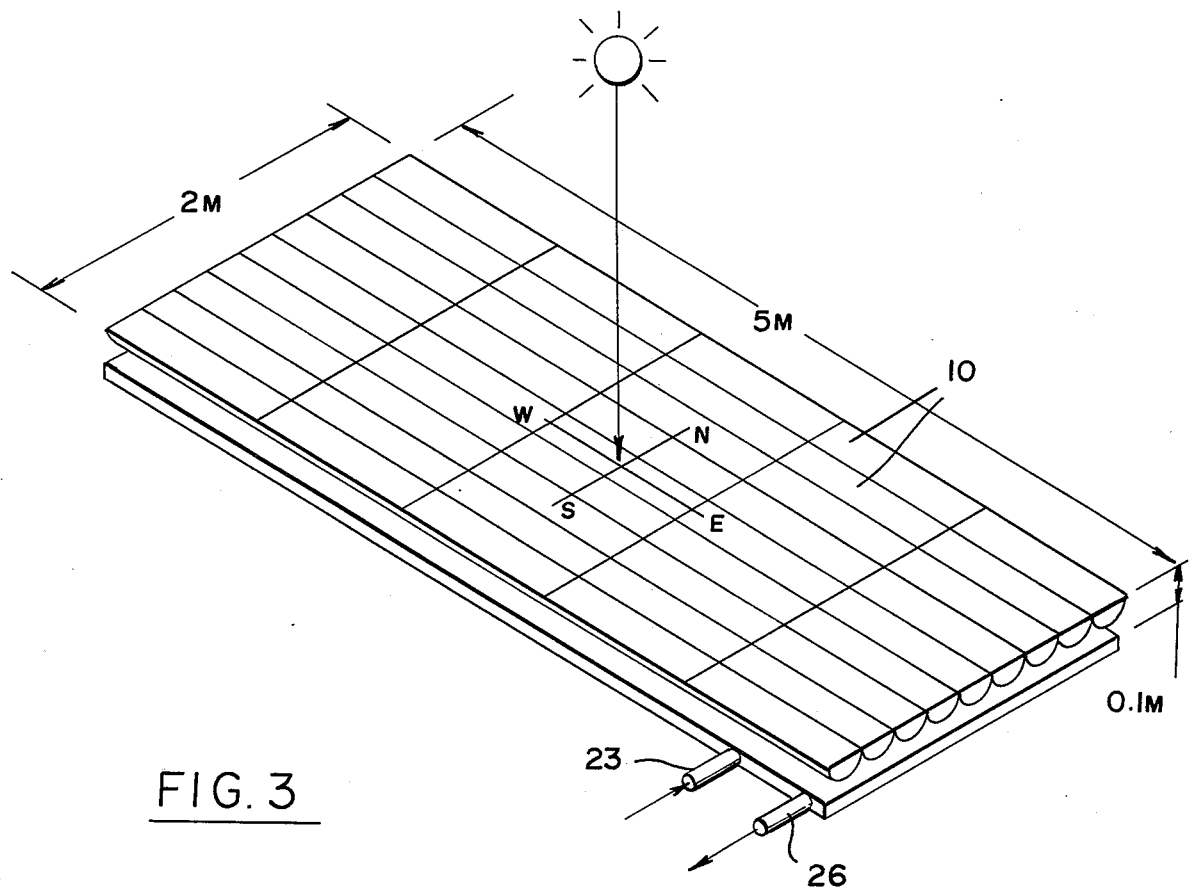

THERMOSTATICALLY CONTROLLED NON-TRACKING TYPE SOLAR ENERGY CONCENTRATOR

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention:

The present invention relates to solar energy concentrators and, more particularly, to a thermostatically controlled non-tracking solar energy concentrator.

2. Description of the Prior Art:

There are many devices which have been developed to extract thermal energy from solar energy or light. These devices are essentially collectors, which are adapted to absorb the thermal component of the solar energy, to heat a fluid, e.g., water. Without the use of some type of concentrator, the temperature to which the water can be raised is generally quite low, so that efficient use of the collected energy is not attainable. Thus, most of the useful devices employ some type of concentrator, and are generally referred to as solar energy concentrators.

In order to increase energy collection efficiency most prior-art concentrators are of the tracking type. They employ a tracking mechanism in order to track the sun movement which changes with time of day and season of the year. These tracking mechanisms are quite expensive, since they require costly pivoting and rocking assemblies and power for operating them, thereby increasing the initial concentrator cost. Also, since these tracking mechanisms include moving parts additional costs are incurred for maintenance and repair. Thus, a need exists for a new solar energy concentrator which exhibits relatively high efficiency, i.e., efficient thermal energy collection, yet does not include a tracking mechanism.

OBJECTS AND SUMMARY OF THE INVENTION

It is an object of the present invention to provide a new efficient solar energy concentrator.

Another object of the invention is to provide a new non-tracking type solar energy concentrator.

A further object of the invention is to provide a relatively new efficient solar energy concentrator which eliminates the need for a tracking mechanism.

These and other objects of the invention are achieved by providing a solar energy concentrator in which solar energy is concentrated by means of an array of cylindrical Fresnel lenses all of which are fixedly positioned and aligned in the East-West direction. Located below the array of lenses is a stationary array of collector elements through which fluid, e.g., water to be heated, is capable of flowing. The collector elements are also aligned in the East-West direction. Fluid flow through each collector element is controlled by a valve which enables fluid to flow therethrough only when the element's temperature exceeds a selected threshold temperature level.

Each lens concentrates the solar light forming an image which extends in the East-West direction, parallel to the lens length. The width of the image in the South-North direction depends on the lens width in this direction and the concentration ratio provided by the lens. Hereinafter the image will be referred to as a line image. The collectors are arranged so that regardless of the sun angle, which due to sun movement changes with time of day and season of the year, the line image produced by each lens focuses on very few, preferably not more than two of the collector elements.

The novel features of the invention are set forth with particularity in the appended claims. The invention will best be understood from the following description when read in conjunction with the accompanying drawings.

BRIEF DESCRIPTION OF THE DRAWINGS

FIGS. 2 and 3 are diagrams related to an array arrangement;

DESCRIPTION OF THE PREFERRED EMBODIMENTS

Figure 1:
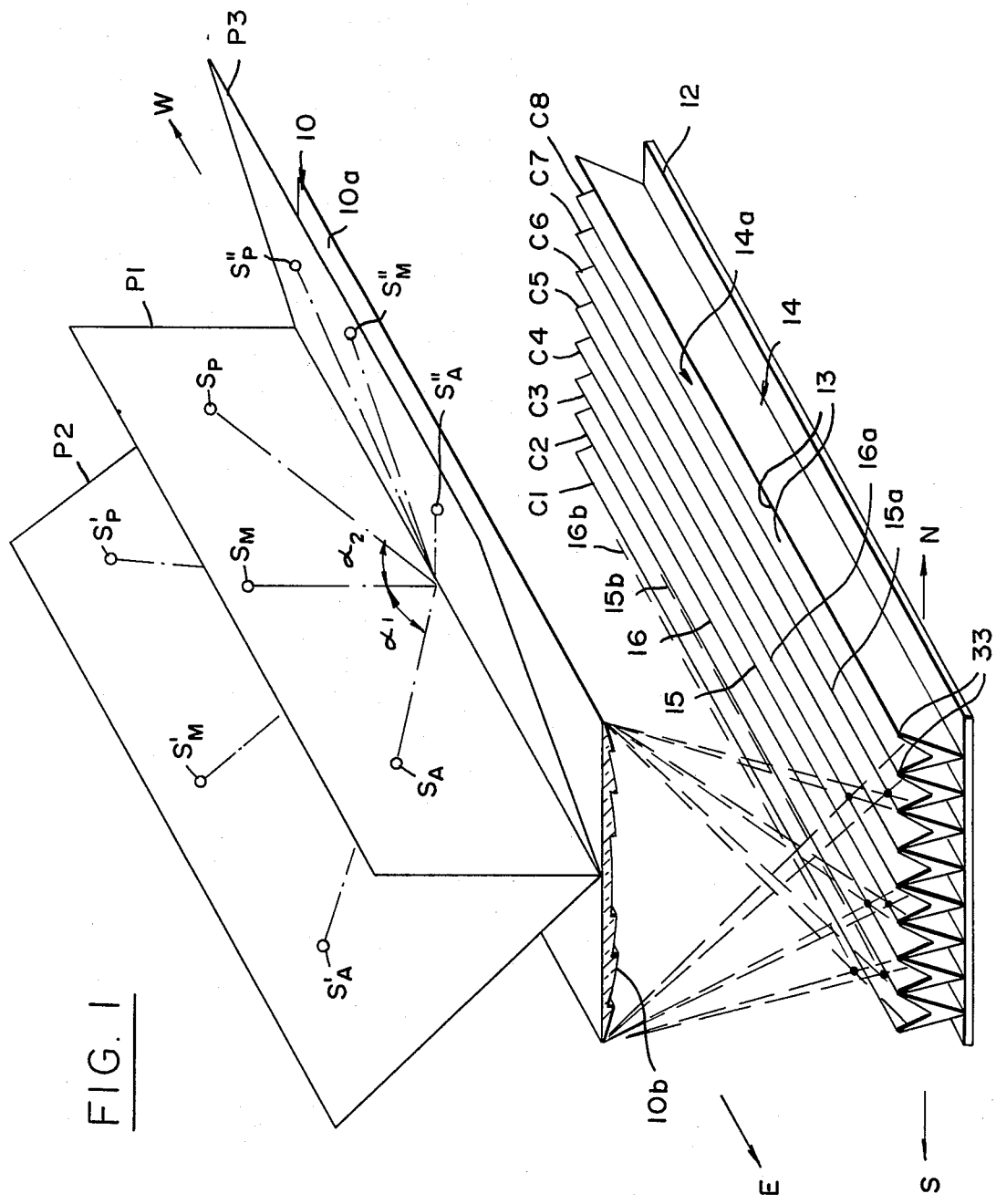
FIG. 1 is an isometric diagram useful in explaining the basic principles of the invention.

Attention is first directed to FIG. 1 wherein a single cylindrical Fresnel lens 10 is shown, with its flat planar surface 10a assumed to face upwardly, so as to face the sun. The lens 10 is fixedly aligned in the East-West (E-W) direction. That is, the lens is located with its long side or length in the E-W direction and its width in the South-North (S-N) direction. Located below the multifaceted side 10b of the lens 10 is a plurality of stationary collector elements, which for explanatory purposes, are limited to eight and are designated by C1-C8. The collector elements are supported by a support structure 12, which is preferably a good thermal insulator. Each of the collector elements is actually a channel through which fluid can flow. Therefore, hereinafter the terms collector element and fluid channel may be used interchangeably.

As shown in FIG. 1, the collector elements, which together define a heat absorber 14, are also aligned in the E-W direction. Each is shown V-shaped. That is, its cross-section, in a direction perpendicular to its length is in the shape of a V. The tips of the elements are interconnected so that the V-shaped top surfaces 13 of the elements define a top corrugated surface 14a of the heat absorber. The elements are parallel to one another and are spaced along the S-N direction.

As is appreciated, the sun angle with respect to any horizontal plane, such as surface 10a of lens 10 changes with the seasons of the year. Also, during any given day, as the sun moves from the East to the West, the sun angle changes somewhat by a few degrees. However, for all practical purposes during any given day the sun movement from a few hours preceding and following the noon hour can be thought of as taking place in a common plane. One such plane is designated in FIG. 1 by P1, which for explanatory purposes only is shown to be perpendicular to surface 10a. Therein, $S_M$, $S_A$, and $S_P$ represent sun positions at the meridian, before noon, and after noon.

Irrespective of the sun position in plane P1 the lens 10 concentrates the sun rays and forms a line image thereof. In FIG. 1, numeral 15 designates the line image formed when the sun is at position $S_M$, i.e., at the meridian. As the sun moves from the meridian a line image is also produced, but at a reduced focal distance from the lens, i.e., closer to the lens and farther away from the fluid channels. Numeral 16 designates the line image for the sun positions $S_A$ and $S_P$.

The width of the line image in the S-N direction depends on the concentration ratio, provided by the lens 10 and its width in the S-N direction. For explanatory purposes, a concentration ratio of 10:1 is assumed for lens 10. To simplify the drawings, line images 15 and 16 are shown of minimum width, i.e. as dots in the S-N direction rather than as short lines of widths (1/10)W, where W represents the lens width in the S-N direction.

In FIG. 1, P2 and P3 designate two other planes in which the sun is assumed to move during different seasons of the year. Three sun positions in plane P2 are designated by $S'_M$, $S'_A$ and $S'_P$ and three similar positions in P3 are designated by $S''_M$, $S''_A$ and $S''_P$. When the sun is in plane P2, line images 15a and 16 a are formed which, as shown in FIG. 1, focus the concentrated sun rays on elements C7 and C8, which are to the right or North of Element C4. On the other hand, when the sun moves in plane P3, line images 15b and 16b are formed which concentrate the sun rays and focus them on elements C2 and/or C1, which are to the left or South of element C4. Thus, the only effect of the sun angle variations is a shift of the location of the line image in the S-N direction. As a result, the sun rays are focused onto different ones of the collectors which are spaced in the S-N direction.

From the foregoing, it should thus be seen that in accordance with the present invention, the cylindrical Fresnel lens is fixedly placed in the E-W direction. Also placed in the same direction are a plurality of collector elements which are spaced apart in the S-N direction. The elements are shaped and spaced apart from each other and the lens so that the sun rays, concentrated by the lens as a line image, are focused on a minimum number of elements, generally not more than two, irrespective of the sun angle which varies with time of day and seasons of the year. This is achieved with both the lens 10 and the collector elements being in fixed stationary positions. Thus, the concentrator of the present invention is of the non-tracking type. In the present invention, sun movement is accounted for by providing a plurality of fluid channels, spaced in the S-N direction.

As previously pointed out, each collector element is one through which fluid is adapted to flow. In accordance with the present invention, each of the collectors has a thermostatically controlled valve associated therewith. These valves permit fluid to flow only through the channel or channels on which the sun rays are focused and whose temperature exceeds a selected threshold temperature level.

As shown in FIG. 2, the inlet ends 20 of channels C1-C8 are shown connected to a common inlet manifold 22 into which fluid to be heated enters from an appropriate source (not shown) through conduit 23. The outlet ends 21 of the channels are connected to a common outlet manifold 25 from which the heated fluid flows through a conduit 26 to any appropriate utilization device 30. Associated with each channel is a separate thermostatically controlled valve 32. Each valve is generally in the closed position. It opens to enable the fluid to flow through its associated channel only when the latter's temperature exceeds the selected threshold temperature level. Thus, the valves control fluid flow to take place only in the channel or channels which are heated by the solar energy to a temperature above the threshold level. In FIG. 2 all the valves 32, except for the valve 32 associated with channel C4, are in the closed position, representing a case in which only the temperature of C4 exceeds the threshold temperature level. In such a case, the fluid entering inlet manifold 22 flows only through the heated channel C4 and the heated fluid exiting the channel C4 passes to the utilization device 30 through manifold 25 and conduit 26. Thus, even though fluid can flow through all the channels, it is limited only to those whose temperature exceeds the threshold temperature level.

Although the invention was described in conjunction with a single lens 10, in practice a plurality of such lenses are arranged in an array of a desired surface area, with all the lenses in the E-W direction. One example of such an array is shown in FIG. 3. It is assumed to be 5m long in the E-W direction and 2m wide in the S-N direction. Assuming each lens to be 1m long and 10cm wide, 100 lenses are required. Also, assuming that each lens has an f number of about 1.0 to 1.5, the image of the sun at the meridian will be located at about 10-15cm from the lens. With a lens width of 10cm and a concentration ratio of 10:1, it will be about 1cm wide in the S-N direction. The lens focal distance, i.e., the image distance from the lens will decrease as the sun moves from the meridian.

With present day technology such lenses can be made from molded plastic to have good efficiency and durability. They can be made quite thin, on the order of 1-2mm thick, even with relatively short focal length. Since a concentration ratio of 10:1 and an f number on the order of 1 to 1.5 are assumed, it can be shown from physical optics calculations that it corresponds to an angular precision of 5° in ray direction. Therefore, the usual lens design considerations, including chromatic aberration, off-axis aberration (i.e., solar declination) and precision of fabrication will not present any problems. Thus, the lenses can be made quite inexpensively, with relatively wide fabrication tolerances.

Based on basic physical optics calculations, it can be shown that with a Fresnel lens with a marginal element of apex angle 30°, which corresponds to a marginal element of f/1.5 lens, a concentration ratio of 10:1 is attainable for declination angles of up to 30° from the meridian, which corresponds to 2 hours before and after the sun is at the meridian. This is for the case with flat face 10a of the lens pointing upwardly, as shown in FIG. 1. With the multifaceted side 10b pointing toward the sun and the flat side 10a toward the channels, the concentration of 10:1 is attained for declination angles of up to 45° from the meridian which corresponds to 3 hours before and after the sun is at the meridian. In FIG. 1, the declination angles before and after the meridian position in plane P1 are designated by $\alpha_1$ and $\alpha_2$, respectively.

The spacing or distance between the channels and the lenses of course depends on the focal distance of the lenses. In FIG. 1, the channels are shown below the image lines 15 and 16, i.e., at a distance greater than the lenses' focal distance. In practice, the channels are located so that the concentrated rays, regardless of declination angle, are intercepted by a minimum number of channels which may be located either ahead or beyond the image plane, i.e., the plane where the image is formed. With an assumed image width of 1cm the tips of each channel should preferably be spaced apart not less and preferably more than 1cm. The tips of the channels are designated in FIG. 1 by numerals 33. The number of channels which need be associated with each lens depends on the width (in the S-N direction) of each channel and the extent of the shift of the image in the S-N direction as the sun angle changes with the seasons of the year.

Figure 4:
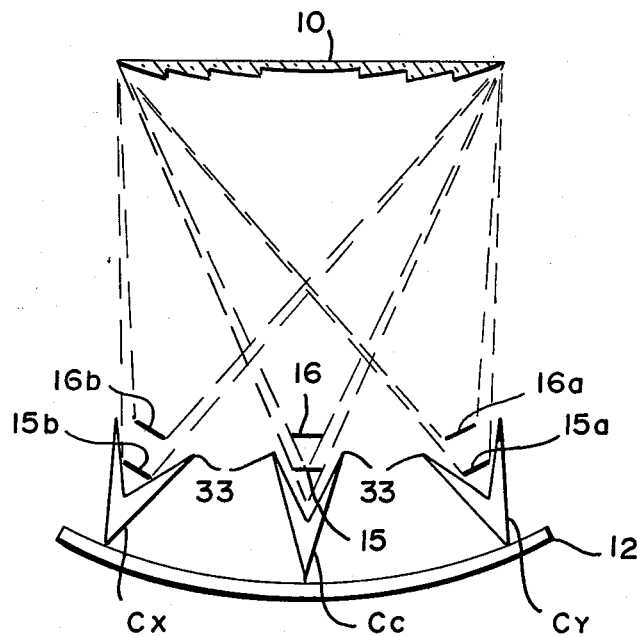
FIG. 4 is a diagram showing variations of the arrangement shown in FIG. 1.

In FIg. 1, all the channels are shown with their tips 33 above the image plane of any of the image lines formed by the lens 10. Also, all the channels are shown with their tips in a plane parallel to the flat surface 10a of the lens and in addition the channels are shown of equal widths, i.e., equal spacing between their tips 33. Such an arrangement is shown for explanatory purposes only. In order to minimize the number of channels on which the concentrated rays focus or impinge, an arrangement as shown in FIG. 4 may be employed. As shown therein, the channels may be supported on a curved rather than flat support member 12. Also, the tips 33 may be closer to the lens so that some of the line images, such as 15, 15a and 15b are formed beyond the channels' tips. In FIG. 4, the images are shown as short lines in the S-N direction rather than as points, as in FIG. 1. As appreciated, the widths of these lines are 1/10 of the lens width for a concentration ratio of 10:1.

Also, the channels may be of variable widths. As shown in FIG. 1, for the sun in either planes P2 and P3 the concentrated rays are assumed to be absorbed by at least two channels, such as C1 and C2 for the sun in plane P3 and channels C7 and C8 for the sun in plane P2. If desired, the outer channels designated $C_x$ and $C_y$ in Fig. 4 may be wider than the width of the center channel $C_c$, thereby reducing the number of channels receiving the concentrated rays when the sun is at other than in a plane P1 perpendicular to the lens surface. With the channel arrangement of FIG. 1, the maximum number of channels on which the concentrated rays are focused may be limited to three even with channel width of not less than the image width. With the channel arrangement of FIG. 4, the maximum number may be reduced to two. It should also be pointed out that the lens 10 needs to be placed with its flat surface 10a in a horizontal tip. In practice, it may be tipped so that during the particular season when highest efficiency is desired, the sun would be moving in a perpendicular plane and its associated rays absorbed by preferably one channel.

The use of the V-shaped channels is believed to be advantageous for several reasons. In such a channel the area of the channel opening defined by the distance between the tips 33 times the length is considerably less than the total area of the top or upper surface 13, thereby reducing the reradiation losses area. Also, each channel can be welded to adjacent channels only at its two tips and to the support member 12 at its apex point, thereby reducing the area of contact through which heat from the heated channel is conductable to adjacent elements. If desired, the space between the lens and the channels and/or the spaces between the lower sides of the channels and the support member 12 may be evacuated to reduce the convection of heat from the heated channel. Furthermore, the spaces between the channels and support member 12 may be packed with insulating material. Any and all of these approaches may be used to reduce heat losses and thereby maximize the amount of heat which is received by each channel to heat the fluid passing therethrough.

The surfaces 13 of the channels which are exposable to the concentrated sun rays should preferably be covered with an infrared (IR) selective coating in order to reduce IR reradiation, and thereby increase the thermal energy absorbed by the channels from the concentrated rays for delivery to the fluid flowing through the heated channel. Various IR selective coatings for such a purpose are available commercially. They include silicon carbide and combinations of molybdenum and silicon oxides.

It should be appreciated that the working fluid need not be limited to water. It can include ethylene glycol, pressurized water or other organic compounds. The utilization device 30 to which the heated fluid is supplied may be any system in which heated fluid is utilized. For example, the heated fluid may be directed to heat exchangers to provide domestic or commercial heating or hot water, or for effecting refrigerative cooling or operating heat engines for electricity generation. Since the ultimate use of the heated fluid is not part of this invention it will not be described in any detail.

As previously pointed out, each channel has at least one valve 32 associated therewith, to control fluid to flow through the channel only when its temperature exceeds a desired level. The valve may be one with a bimetallic snap action element with two positions, one stable when hot and the other when cold. Alternately, a valve which proportionately controls fluid rate as a function of temperature may be used to maintain the desired output temperature of the fluid. Also, each valve may be mounted to be influenced directly by the solar energy striking the outside of the channel surface as well as by the actual temperature of the fluid in the heated channel.

It can be shown that at 42°N latitude under clear sky conditions conversion efficiency of the order of about 60% is achievable with a lens with a transmission coefficient $\beta=.9$, a channel with an equivalent absorptivity $\alpha=.9$, and a concentration factor $\gamma=10$. The power received by the heat absorber 14 may be defined as $P_i$ and expressed as $$P_i = \alpha\beta p_{in} A, \tag{1}$$

where $p_{in}$ is the solar flux in w/cm² and A is the area of the receiver facing the sun. In FIG. 3, A is assumed to be $10 m^2 = 10^5 cm^2$. The received power $p_i$ is equal to the power removed by the fluid, represented by $P_o$, plus the losses due to reradiation $P_r$, structural conduction $P_c$ and convection $P_{cv}$. That is, $$P_i = P_o + P_r + P_c + P_{cv} = P_o + P_L, \tag{2}$$

where $P_L$ is the total power loss. It is reasonable to estimate $P_L$ to equal 1.5 times the reradiation loss $P_r$ from one active channel surface at a temperature of T + 273°K. Thus, one obtains that $$P_L = 1.5e(5.670 \times 10^{-12}) (T+273)^4 \gamma A \tag{3}$$

where $e$ is the infrared emissivity and $\gamma A$ is the area on which the sun's image is formed and from which reradiation takes place.

Substituting expressions 1 and 3 in expression 2, one obtains, $$\alpha\beta p_{in} A = P_o + 1.5e(5.670 \times 10^{-12}) (T+273)^4 \gamma A \tag{4}$$

Thus, the output power per unit of the collector area is $$P_o/A = \alpha\beta p_{in} - 1.5e\gamma (5.670 \times 10^{-12}) (T+273)^4 \tag{5}$$

and the efficiency can be expressed as $$\eta = \frac{P_o}{P_{in}A} = \alpha\beta - \frac{1.5e\gamma\ (5.670\times10^{-12})\ (T+273)^4}{P_{in}} \quad (6)$$

Assuming an infrared emissivity $e=.9$ for a case without special IR coating on the outer surfaces 13 of the channels and a channel temperature of $T=150°C$ with an adjusted flow rate to obtain such a temperature, and further assuming $p_{in} = 0.1 w/cm^2$, representing one solar constant $$\eta = .9 \times .9 - \frac{1.5 \times 0.9 \times 0.9 (5.670 \times 10^{-12})(150+273)^4}{.1}$$

$$\cong .81 - .24 \cong .57 \text{ or } 57\%.$$

It is of interest to derive the relationship between the fluid temperature and flow rate. In addition to water possible choices of the fluid among others are water with a boiling temperature higher than 300°C, i.e., pressurized water, ethylene glycol, or other orgainic compounds. Let the removed power in watts be $$P_o = 4.18 \times (T-30) \times V \quad (7)$$

where $V$ is the flow rate in cc/s, and $T$ the final temperature. The number 30 represents an assumed inlet temperature. Substituting expression (7) in expression (4) with $T=150°C$, one obtains $$.9 \times .9 \times p_{in} \times 10^5 = 4.18(150-30)V + 1.5e(5.670\times10^{-12})\ (150+273)^4 \times .1 \times 10^5 \quad (8)$$

Figure 5:
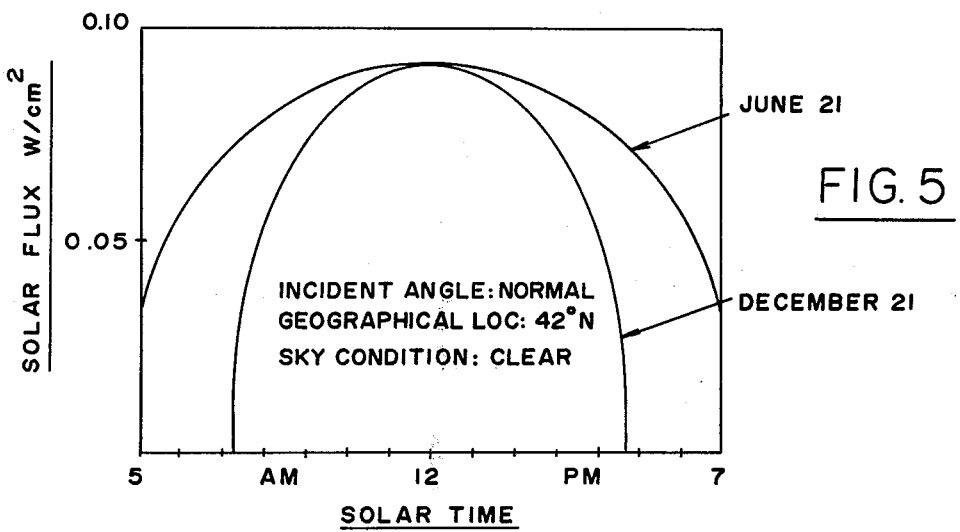
FIGS. 5 and 6 are diagrams of curves of solar flux and flow rates, respectively.
Figure 6:
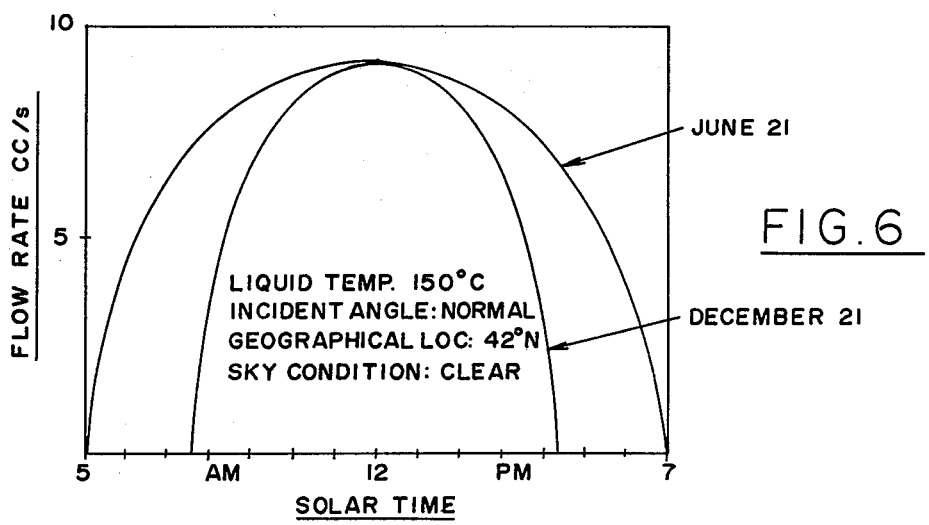

Assuming that $e=.9$ and using FIG. 5 which is a plot of the diurnal variation of solar flux at 42°N latitude which is available from the U.S. Weather Bureau, one can derive the flow rate at 150°C for different times of day and seasons of the year. The derived flow rates are shown in FIG. 6. In FIG. 6 it is seen that a minimum flow rate of 3cc/s, equaling 2.38gal/h, at 150°C is obtainable for approximately 8 hours per day during the winter (December 21) and for approximately 12.6 hours per day during the summer (June 21), provided the sky is clear. Integrating the flow rates under the curves the total output at 150°C per day can be shown to equal about 47.5 gallons on December 21 and 76 gallons on June 21. The corresponding energy deliveries are 24.6kW-h and 39.3kW-h, respectively. When compared with the integrated power input under the curves of FIG. 5 it is seen that even without the IR coating reasonable output power is obtainable, due to the relatively high concentrator efficiency. With the selective coating even higher efficiencies are achievable. This should be apparent from equation (8) since with the IR coating $e=.1$ can be assumed rather than $e=.9$, used in deriving the flow rates shown in FIG. 6.

Fresnel lenses with a concentration ratio of 10:1 ($\gamma=.1$) and a transmission coefficient $\beta=.9$ are easily attainable. Also, the channels due to their V-shaped cross section can be produced with an equivalent absorptivity of $\alpha=.9$. Thus, the novel concentrator of the present invention can be produced to provide relatively high efficiency without the use of any tracking mechanism. Also, IR coatings are presently available with which the channels' IR emissivity e can be made to be quite small, e.g., $e=.1$.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A solar energy concentrator comprising:
   a cylindrical lens fixedly positioned in an East-West direction and exposable to the sun for concentrating the sun rays and providing a line image thereof;
   a plurality of elongated fluid channels, each channel defining an inlet end and an outlet end and an opening, extending between said ends, through which fluid is adapted to flow;
   support means for fixedly supporting said channels adjacent said lens with said channels extending in the East-West direction and are spaced apart in the South-North direction, whereby the sun rays concentrated by said lens are focused on less than all of said channels;
   fluid input means coupled to the input ends of all of said channels for communicating fluid thereto;
   fluid output means coupled to the outlet ends of all of said channels for receiving the fluid flowing through any of said channels; and
   a separate thermostatically controlled valve associated with each of said channels for controlling the flow of fluid through the associated channel only when said valve senses a temperature which is not less than a preselected threshold temperature.

2. The concentrator as described in claim 1 wherein each valve is not less than said preselected threshold temperature, whereby fluid communicated to the channel's inlet end by said fluid input means flows through the channel, said valve being in a closed position to inhibit fluid flow through its associated channel when the temperature sensed by the valve is below said preselected temperature.

3. The concentrator as described in claim 1 wherein said channels are spaced from one another and said lens whereby any sun rays concentrated by said lens are focused onto not more than three of said channels irrespective of the sun angle with respect to the horizon.

4. The concentrator as described in claim 1 wherein said lens is a cylindrical Fresnel lens.

5. The concentrator as described in claim 4 wherein each of said channels is V-shaped with the tips of adjacent channels being adjacent one another to define a top corrugated surface.

6. The concentrator as described in claim 5 wherein the top surface of each channel exposable to the concentrated sun rays is coated with a heat absorbing coating.

7. The concentrator as described in claim 5 wherein each valve is not less than said preselected threshold temperature, whereby fluid communicated to the channel's inlet end by said fluid input means flows through the channel, said valve being in a closed position to inhibit fluid flow through its associated channel when the temperature sensed by the valve is below said preselected temperature and wherein said channels are spaced from one another and said lens whereby any sun rays concentrated by said lens are focused onto not more than three of said channels irrespective of the sun angle with respect to the horizon.

8. The concentrator as described in claim 1 including a plurality of cylindrical lenses arranged in a rectangular array of selected surface area with all the lenses fixedly positioned in the East-West direction, with said channels disposed below said lenses in the East-West direction and spaced apart in the South-North direction and wherein each valve is not less than said preselected threshold temperature, whereby fluid communicated to the channel's inlet end by said fluid input means flows through the channel, said valve being in a closed position to inhibit fluid flow through its associated channel when the temperature sensed by the valve is below said preselected temperature.

9. The concentrator as described in claim 8 wherein each of said lenses is a cylindrical Fresnel lens.

10. The concentrator as described in claim 9 wherein each of said channels is V-shaped with the tips of adjacent channels being adjacent one another to define a top corrugated surface.

* * * * *